(12) United States Patent
Muff et al.

(10) Patent No.: US 7,921,278 B2
(45) Date of Patent: *Apr. 5, 2011

(54) EARLY EXIT PROCESSING OF ITERATIVE REFINEMENT ALGORITHM USING REGISTER DEPENDENCY DISABLE

(75) Inventors: Adam James Muff, Rochester, MN (US); Matthew Ray Tubbs, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 420 days.

This patent is subject to a terminal disclaimer.

(21) Appl. No.: 12/045,313

(22) Filed: Mar. 10, 2008

(65) Prior Publication Data

US 2009/0228690 A1   Sep. 10, 2009

(51) Int. Cl.
*G06F 9/30* (2006.01)
*G06F 9/40* (2006.01)
*G06F 7/38* (2006.01)
*G06F 9/00* (2006.01)
*G06F 9/44* (2006.01)

(52) U.S. Cl. .......... 712/216; 712/222; 712/226
(58) Field of Classification Search ........... 712/222, 712/216, 226
See application file for complete search history.

(56) References Cited

U.S. PATENT DOCUMENTS

| 3,577,190 | A | * | 5/1971 | Cocke et al. | 712/226 |
| 5,303,355 | A | * | 4/1994 | Gergen et al. | 712/241 |
| 5,832,258 | A | * | 11/1998 | Kiuchi et al. | 712/226 |
| 6,079,008 | A | * | 6/2000 | Clery, III | 712/11 |

\* cited by examiner

*Primary Examiner* — Eddie P Chan
*Assistant Examiner* — William B Partridge
(74) *Attorney, Agent, or Firm* — Wood, Herron & Evans, LLP

(57) ABSTRACT

An "early exit" of an iterative refinement algorithm is implemented by effectively disabling read after write dependency stalls of newer instructions, as well as disabling the register write enable of these instructions, for the remainder of the algorithm, in addition to disabling the register write enable of these instructions. By doing so, the latency of the algorithm is reduced and the performance is increased without the complexity and potential poor performance of compare and branch instructions that might otherwise be required.

25 Claims, 9 Drawing Sheets

| 1  | 2 | 3 | 4  | 5 | 6 | 7  | 8 | 9 | 10 | 11 | 12 | 13 | 14 | 15 | 16 | 17 | 18 | 19 | 20 | 21 | 22   |
|----|---|---|----|---|---|----|---|---|----|----|----|----|----|----|----|----|----|----|----|----|------|
| R0 |   |   |    |   |   |    |   |   |    |    |    |    |    |    |    |    |    |    |    |    |      |
|    |   |   | E0 |   |   |    |   |   |    |    |    |    |    |    |    |    |    |    |    |    |      |
|    |   |   |    |   |   | R1 |   |   |    |    |    |    |    |    |    |    |    |    |    |    |      |
|    |   |   |    |   |   |    |   |   | E1 |    |    |    |    |    |    |    |    |    |    |    |      |
|    |   |   |    |   |   |    |   |   |    |    |    | R2 |    |    |    |    |    |    |    |    |      |
|    |   |   |    |   |   |    |   |   |    |    |    |    |    |    | E2 |    |    |    |    |    |      |
|    |   |   |    |   |   |    |   |   |    |    |    |    |    |    |    |    |    | R3 |    |    | done |

| 1  | 2 | 3 | 4  | 5 | 6 | 7  | 8 | 9 | 10 | 11 | 12 | 13 | 14 | 15 | 16 | 17 | 18   | 19 | 20 | 21 | 22 |
|----|---|---|----|---|---|----|---|---|----|----|----|----|----|----|----|----|------|----|----|----|----|
| R0 |   |   |    |   |   |    |   |   |    |    |    |    |    |    |    |    |      |    |    |    |    |
|    |   |   | E0 |   |   |    |   |   |    |    |    |    |    |    |    |    |      |    |    |    |    |
|    |   |   |    |   |   | R1 |   |   |    |    |    |    |    |    |    |    |      |    |    |    |    |
|    |   |   |    |   |   |    |   |   | E1 |    |    |    |    |    |    |    |      |    |    |    |    |
|    |   |   |    |   |   |    |   |   |    |    |    | R2 |    |    |    |    |      |    |    |    |    |
|    |   |   |    |   |   |    |   |   |    |    |    |    |    |    | E2 |    |      |    |    |    |    |
|    |   |   |    |   |   |    |   |   |    |    |    |    |    |    |    | R3 | done |    |    |    |    |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|
| R0 | | | | | | | | | | | | | | | | | | | | | |
| | | | E0 | | | | | | | | | | | | | | | | | | |
| | | | | | | R1 | | | | | | | | | | | | | | | |
| | | | | | | | | | E1 | | | | | | | | | | | | |
| | | | | | | | | | | | | R2 | | | | | | | | | |
| | | | | | | | | | | | | | | | E2 | | | | | | |
| | | | | | | | | | | | | | | | | | | R3 | done | | |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 |
|---|---|---|---|---|---|---|---|---|---|---|---|---|---|---|---|---|---|---|---|---|---|
| R0 | | | | | | | | | | | | | | | | | | | | | |
| | | | E0 | | | | | | | | | | | | | | | | | | |
| | | | | | | R1 | | | | | | | | | | | | | | | |
| | | | | | | | | | E1 | | | | | | | | | | | | |
| | | | | | | | | | | | | R2 | | | | | | | | | |
| | | | | | | | | | | | | | | E2 | | | | | | | |
| | | | | | | | | | | | | | | | R3 | done | | | | | |

EARLY EXIT PROCESSING OF ITERATIVE REFINEMENT ALGORITHM USING REGISTER DEPENDENCY DISABLE

CROSS REFERENCE TO RELATED APPLICATIONS

This application is related to U.S. patent application Ser. No. 12/045,243, filed on even date herewith by Muff et al., and entitled "EARLY EXIT PROCESSING OF ITERATIVE REFINEMENT ALGORITHM USING REGISTER DEPENDENCY DISABLE AND PROGRAMMABLE EARLY EXIT CONDITION,", the disclosure of which is incorporated by reference herein in its entirety.

FIELD OF THE INVENTION

The invention is generally related to data processing, and in particular to processor architectures and execution units incorporated therein.

BACKGROUND OF THE INVENTION

As semiconductor technology continues to inch closer to practical limitations in terms of increases in clock speed, architects are increasingly focusing on parallelism in processor architectures to obtain performance improvements. At the chip level, multiple processor cores are often disposed on the same chip, functioning in much the same manner as separate processor chips, or to some extent, as completely separate computers. In addition, even within cores, parallelism is employed through the use of multiple execution units that are specialized to handle certain types of operations. Pipelining is also employed in many instances so that certain operations that may take multiple clock cycles to perform are broken up into stages, enabling other operations to be started prior to completion of earlier operations. Multithreading is also employed to enable multiple instruction streams to be processed in parallel, enabling more overall work to performed in any given clock cycle.

One area where parallelism continues to be exploited is in the area of execution units, e.g., fixed point or floating point execution units. Many floating point execution units, for example, are deeply pipelined. However, while pipelining can improve performance, pipelining is most efficient when the instructions processed by a pipeline are not dependent on one another, e.g., where a later instruction does not use the result of an earlier instruction. Whenever an instruction operates on the result of another instruction, typically the later instruction cannot enter the pipeline until the earlier instruction has exited the pipeline and calculated its result. The later instruction is said to be dependent on the earlier instruction, and phenomenon of stalling the later instruction waiting for the result of an earlier instruction is said to introduce "bubbles," or cycles where no productive operations are being performed, into the pipeline.

Dependencies have been found to adversely affect a number of different types of programs that are executed by an execution unit. For example, refinement algorithms that operate iteratively to calculate the result of a mathematical function often incorporate dependencies that can limit the performance of such algorithms. An iterative refinement algorithm, which may be used to find the result of a number of different types of mathematical functions, repetitively performs mathematical calculations that approximate a given mathematical function over multiple iterations to progressively approach, or converge to, the desired result with a required accuracy.

One common iterative refinement algorithm is the "Newton-Raphson" method, which involves approximating a function at its tangent line to the previous approximation. The derivation is shown below:

$$\text{slope of } f(x_n) = \frac{\Delta y}{\Delta x} = f'(x_n) = \frac{f(x_n) - f(x_{n+1})}{x_n - x_{n+1}}$$

where n is the iteration number, f(x) is the function desired, and f'(x) is the first derivative of that function.

The Newton-Raphson method is often used to find the reciprocal of a number, since fully accurate reciprocal functions are often costly to implement in hardware due to their long latency, complexity and large circuit area. Plugging the reciprocal function into this equation becomes:

$$-\frac{1}{B^2} = \frac{\left(\frac{1}{b} - \frac{1}{B}\right)}{(b - B)}$$

where B is the value passed into the reciprocal function and b is its approximation. This reduces to:

$$\frac{1}{B} = -\frac{B}{b^2} + \frac{2}{b} = \frac{1}{b}\left(1 - \frac{B}{b}\right) + \frac{1}{b}$$

Table I below illustrates exemplary POWERPC assembly code for implementing this method over three iterations, where B is the operand of the reciprocal function, and rn is the result of the reciprocal function, with increasing numbers denoting higher accuracy with each iteration:

TABLE I

Newton-Raphson POWERPC Assembly Code

| | | |
|---|---|---|
| fres | r0, B | # r0 = estimate 1/B |
| fnmsub | e0, r0, B, one | # e0 = 1−(B*r0) |
| fmadd | r1, r0, e0, r0 | # r1 = r0*e0 + r0 |
| fnmsub | e1, r1, B, one | # e1 = 1−(B*r1) |
| fmadd | r2, r1, e1, r1 | # r2 = r1*e1 + r1 |
| fnmsub | e2, r2, B, one | # e2 = 1−(B*r2) |
| fmadd | r3, r2, e2, r2 | # r3 = r2*e2 + r2 |

It should be noted that, in each iteration, the fmadd instruction is dependent upon the fnmsub instruction, because the value for e0, which is calculated by the fnmsub instruction, must be calculated before it can be used as an input to the fmadd instruction. Consequently, each fmadd instruction is required to stall until the result of the immediately preceding fnmsub instruction is available. Similarly, each fnmsub instruction is dependent upon either the fres instruction (for the first iteration) or the fmadd instruction from the preceding iteration due to the use of the result of the prior iteration in the calculations for the next iteration. In a multi-stage execution pipeline that requires a dependent instruction to start executing no earlier than the fourth cycle after its previous instruction, as an example, each iteration of the algorithm may therefore introduce as many as four bubbles in the pipeline, delaying the completion of the algorithm and reducing the processing efficiency of the execution unit.

Often compounding the performance problem raised by dependencies, in the Newton-Raphson method, as well as in other iterative refinement algorithms, a result sometimes may be obtained that has reached the desired accuracy before the maximum number of iterations have completed. Tables II and III below, for example, present two simplified examples that use the Newton-Raphson method to find the reciprocal of a double precision floating point number. In these examples, fres, the POWERPC floating point reciprocal estimate function, is assumed to be a 10 bit accuracy version, while fdiv is the POWERPC floating point divide function, illustrating the value to which the algorithm is attempting to converge:

TABLE II

Newton-Raphson Example A

B = 1.019 = 0x3FF04DD2F1A9FBE7
| 1/B= fdiv(1,B) | | 3FEF67411155AB17 0.981354 |
| r0 = fres(B) | = | 3F7B40003F826E98 0.006653 (1/B) |
| t = fnmsub(r0,B,1) | = | BF1851EB851E9DB0 −0.0000927734 (1−(B*r0)) |
| r1 = fmadd(r0,t,r0) | = | 3FEF67410CCCCCCE 0.981354 (r0*t + r0) |
| e1 = fnmsub(r1,B,1) | = | 3E427BB2FD3570E1 0.000000 (1−(B*r1)) |
| r2 = fmadd(r1,e1,r1) | = | 3FEF67411155AB16 0.981354 (r1*e1 + r1) |
| e2 = fnmsub(r2,B,1) | = | 3C95F5416ADC1A4C 0.000000 (1−(B*r2)) |
| r3 = fmadd(r2,e2,r2) | = | 3FEF67411155AB17 0.981354 (r2*e2+ r2) |

TABLE III

Newton-Raphson Example B

B = 1.02 = 0x3FF051EB851EB852
| 1/B | = | fdiv(1,B) | = | 3FEF5F5F5F5F5F5F 0.980392 |
| r0 | = | fres(B) | = | 3F7B00003F828F5C 0.006592 (1/B) |
| t | = | fnmsub(r0,B,1) | = | BF147AE147AE1980 −0.0000781250 (1−(B*r0)) |
| r1 | = | fmadd(r0,t,r0) | = | 3FEF5F5F5C28F5C2 0.980392 (r0*t + r0) |
| e1 | = | fnmsub(r1,B,1) | = | 3E3A36E2EE6CD33A 0.000000 (1−(B*r1)) |
| r2 | = | fmadd(r1,e1,r1) | = | 3FEF5F5F5F5F5F5F 0.980392 (r1*e1 + r1) |
| e2 | = | fnmsub(r2,B,1) | = | 3C7C8FC2F6295C90 0.000000 (1−(B*r2)) |
| r3 | = | fmadd(r2,e2,r2) | = | 3FEF5F5F5F5F5F5F 0.980392 (r2*e2+ r2) |

Table II shows an example where, in order to achieve the desired accuracy, three iterations of the method are needed. It should be noted, however, that for Example B in Table III, the desired accuracy is achieved after only two iterations. As a result, if the algorithm is executed through the full three iterations, the result of the algorithm is still not available until completion of all three iterations. In addition, the last iteration still introduces the aforementioned dependencies, thus further delaying the completion of the algorithm.

In the situation where a desired result is reached in less than the full number of iterations, an opportunity exists for an "early exit" to the algorithm. However, in many conventional microprocessor designs, the algorithm is used in microcode or in a sequencer unit to perform division. Oftentimes even if an early exit condition is possible, the procedure isn't designed to handle them because methods such as including compares and branches in the routine cause too much complexity or too much cycle time overhead, causing the performance of the overall routine to drop. Particularly in scenarios where it is known that the desired accuracy can be achieved in three or four iterations in most if not all cases, the overhead associated with comparing and branching out of a loop prematurely exceeds the potential benefit of supporting an early exit from the routine.

Consequently, a need exists in the art for a manner of improving the performance of iterative refinement algorithms, and in particular, for a manner of improving the performance of iterative refinement algorithms executed by execution units having multi-stage execution pipelines.

SUMMARY OF THE INVENTION

The invention addresses these and other problems associated with the prior art by providing an "early exit" of an iterative refinement algorithm by effectively disabling read after write dependency stalls of newer instructions, as well as disabling the register write enable of these instructions, for the remainder of the algorithm. By doing so, the latency of the algorithm is reduced and the performance is increased without the complexity and potential poor performance of compare and branch instructions that might otherwise be required.

Consistent with one aspect of the invention, a circuit arrangement is provided that includes a register file, a multi-stage execution pipeline coupled to the register file and configured to execute an iterative refinement algorithm by executing a plurality of instructions, where the plurality of instructions includes at least one write back to the register file and at least one instruction with a dependency, and dependency logic configured to selectively stall issuance of instructions having dependencies to the execution pipeline. The circuit arrangement also includes early exit logic configured to, in response to detection of an early exit condition during execution of the iterative refinement algorithm by the multi-stage execution pipeline prior to completing execution of the iterative refinement algorithm, disable the write back to the register file and disable the stall of the instruction with the dependency by the dependency logic such that execution of the iterative refinement algorithm is completed with the write back to the register file and the stall of the instruction with the dependency disabled.

Consistent with another aspect of the invention, a method is provided for executing a refinement algorithm in a processing unit of the type including a multi-stage execution pipeline, a register file coupled to the multi-stage execution pipeline and dependency logic configured to selectively stall issuance of instructions having dependencies to the execution pipeline. The method includes executing an iterative refinement algorithm, including executing a plurality of instructions that includes at least one write back to the register file and at least one instruction with a dependency. The method also includes, in response to detecting an early exit condition prior to completing execution of the iterative refinement algorithm, disabling the write back to the register file and disabling the stall of the instruction with the dependency by the dependency logic such that execution of the iterative refinement algorithm is completed with the write back to the register file and the stall of the instruction with the dependency disabled.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention assist in decreasing the latency of an iterative refinement algorithm in early exit cases by disabling the dependency logic for subsequent instructions in the algorithm and disabling their write enable signals to a register array when an early exit condition has been detected to effectively disable write back to the register file by such instructions. By doing so, the subsequent instructions are able to flow through a multi-stage execution pipeline without the delays that would otherwise be required in order to comply with dependency requirements, thereby accelerating the completion of the algorithm. In addition, in some embodiments, such algorithms may incorporate a programmable early exit condition to enable such algorithms to be customized to control at which point an early exit condition is reached and the iterative refinement algorithms are terminated, e.g., by specifying a threshold against which an intermediate result of the algorithm is compared.

Embodiments consistent with the invention may be utilized in connection with a wide variety of iterative refinement algorithms without departing from the spirit and scope of the invention. For example, in addition to the aforementioned Newton-Raphson method, embodiments of the invention may be used in iterative refinement algorithms such as Taylor or Maclaurin series approximations. Other suitable algorithms will be appreciated by one of ordinary skill in the art having the benefit of the instant disclosure.

Hardware and Software Environment

Figure 1:
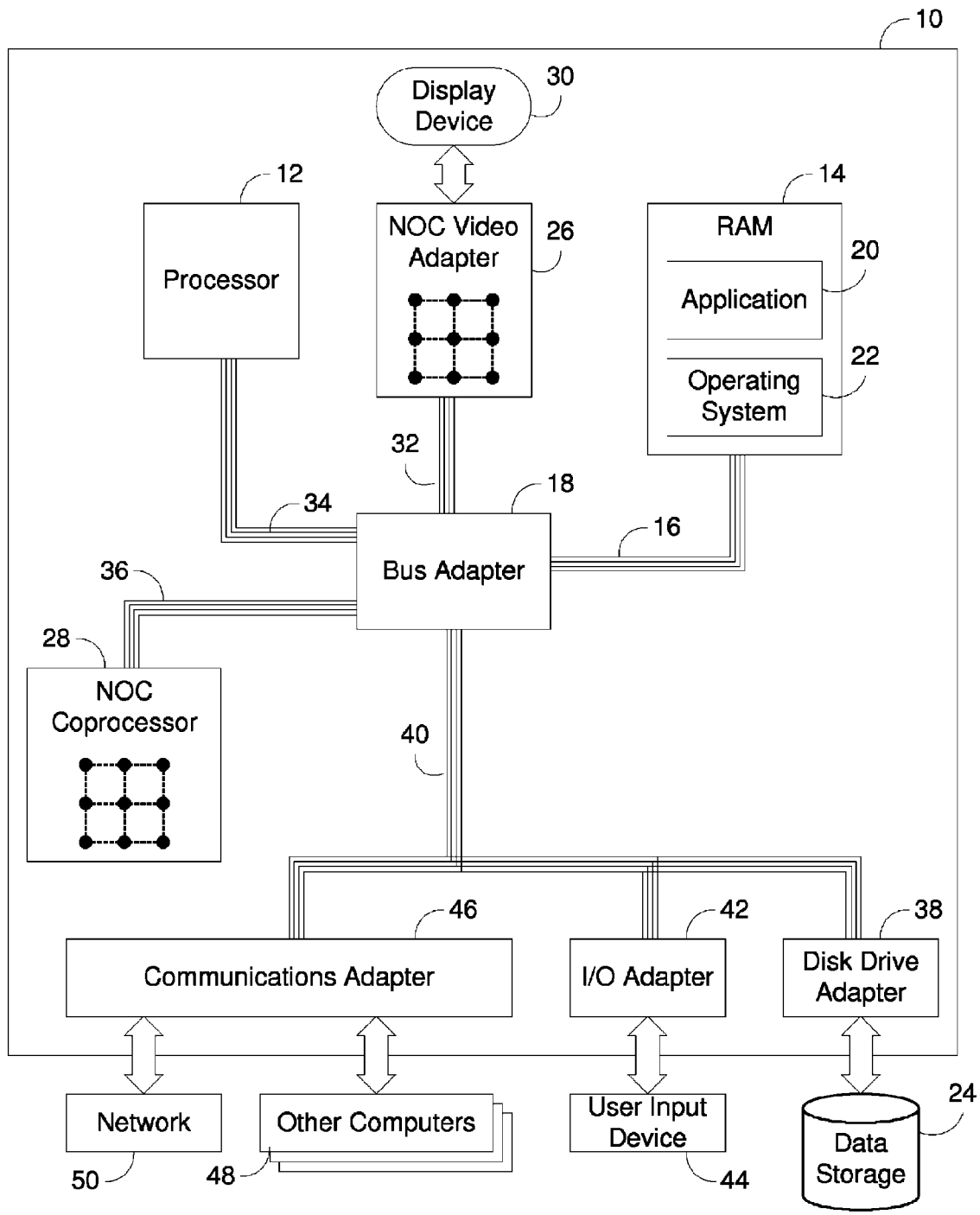
FIG. 1 is a block diagram of exemplary automated computing machinery including an exemplary computer useful in data processing consistent with embodiments of the present invention.

Now turning to the drawings, wherein like numbers denote like parts throughout the several views, FIG. 1 illustrates exemplary automated computing machinery including an exemplary computer 10 useful in data processing consistent with embodiments of the present invention. Computer 10 of FIG. 1 includes at least one computer processor 12 or 'CPU' as well as random access memory 14 ('RAM'), which is connected through a high speed memory bus 16 and bus adapter 18 to processor 12 and to other components of the computer 10.

Stored in RAM 14 is an application program 20, a module of user-level computer program instructions for carrying out particular data processing tasks such as, for example, word processing, spreadsheets, database operations, video gaming, stock market simulations, atomic quantum process simulations, or other user-level applications. Also stored in RAM 14 is an operating system 22. Operating systems useful in connection with embodiments of the invention include UNIX™, Linux™, Microsoft Windows XP™, AIX™, IBM's i5/OS™, and others as will occur to those of skill in the art. Operating system 22 and application 20 in the example of FIG. 1 are shown in RAM 14, but many components of such software typically are stored in non-volatile memory also, e.g., on a disk drive 24.

As will become more apparent below, embodiments consistent with the invention may be implemented within Network On Chip (NOC) integrated circuit devices, or chips, and as such, computer 10 is illustrated including two exemplary NOCs: a video adapter 26 and a coprocessor 28. NOC video adapter 26, which may alternatively be referred to as a graphics adapter, is an example of an I/O adapter specially designed for graphic output to a display device 30 such as a display screen or computer monitor. NOC video adapter 26 is connected to processor 12 through a high speed video bus 32, bus adapter 18, and the front side bus 34, which is also a high speed bus. NOC Coprocessor 28 is connected to processor 12 through bus adapter 18, and front side buses 34 and 36, which is also a high speed bus. The NOC coprocessor of FIG. 1 may be optimized, for example, to accelerate particular data processing tasks at the behest of the main processor 12.

The exemplary NOC video adapter 26 and NOC coprocessor 28 of FIG. 1 each include a NOC, including integrated processor ('IP') blocks, routers, memory communications controllers, and network interface controllers, the details of which will be discussed in greater detail below in connection with FIGS. 2-3. The NOC video adapter and NOC coprocessor are each optimized for programs that use parallel processing and also require fast random access to shared memory. It will be appreciated by one of ordinary skill in the art having the benefit of the instant disclosure, however, that the invention may be implemented in devices and device architectures other than NOC devices and device architectures. The invention is therefore not limited to implementation within an NOC device.

Computer 10 of FIG. 1 includes disk drive adapter 38 coupled through an expansion bus 40 and bus adapter 18 to processor 12 and other components of the computer 10. Disk drive adapter 38 connects non-volatile data storage to the computer 10 in the form of disk drive 24, and may be implemented, for example, using Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

Computer 10 also includes one or more input/output ('I/O') adapters 42, which implement user-oriented input/output through, for example, software drivers and computer hardware for controlling output to display devices such as computer display screens, as well as user input from user input devices 44 such as keyboards and mice. In addition, computer 10 includes a communications adapter 46 for data communications with other computers 48 and for data communications with a data communications network 50. Such data communications may be carried out serially through RS-232 connections, through external buses such as a Universal Serial Bus ('USB'), through data communications data communications networks such as IP data communications networks, and in other ways as will occur to those of skill in the art. Communications adapters implement the hardware level of data communications through which one computer sends data communications to another computer, directly or through a data communications network. Examples of communications adapters suitable for use in computer 10 include modems for wired dial-up communications, Ethernet (IEEE 802.3) adapters for wired data communications network communications, and 802.11 adapters for wireless data communications network communications.

Figure 2:
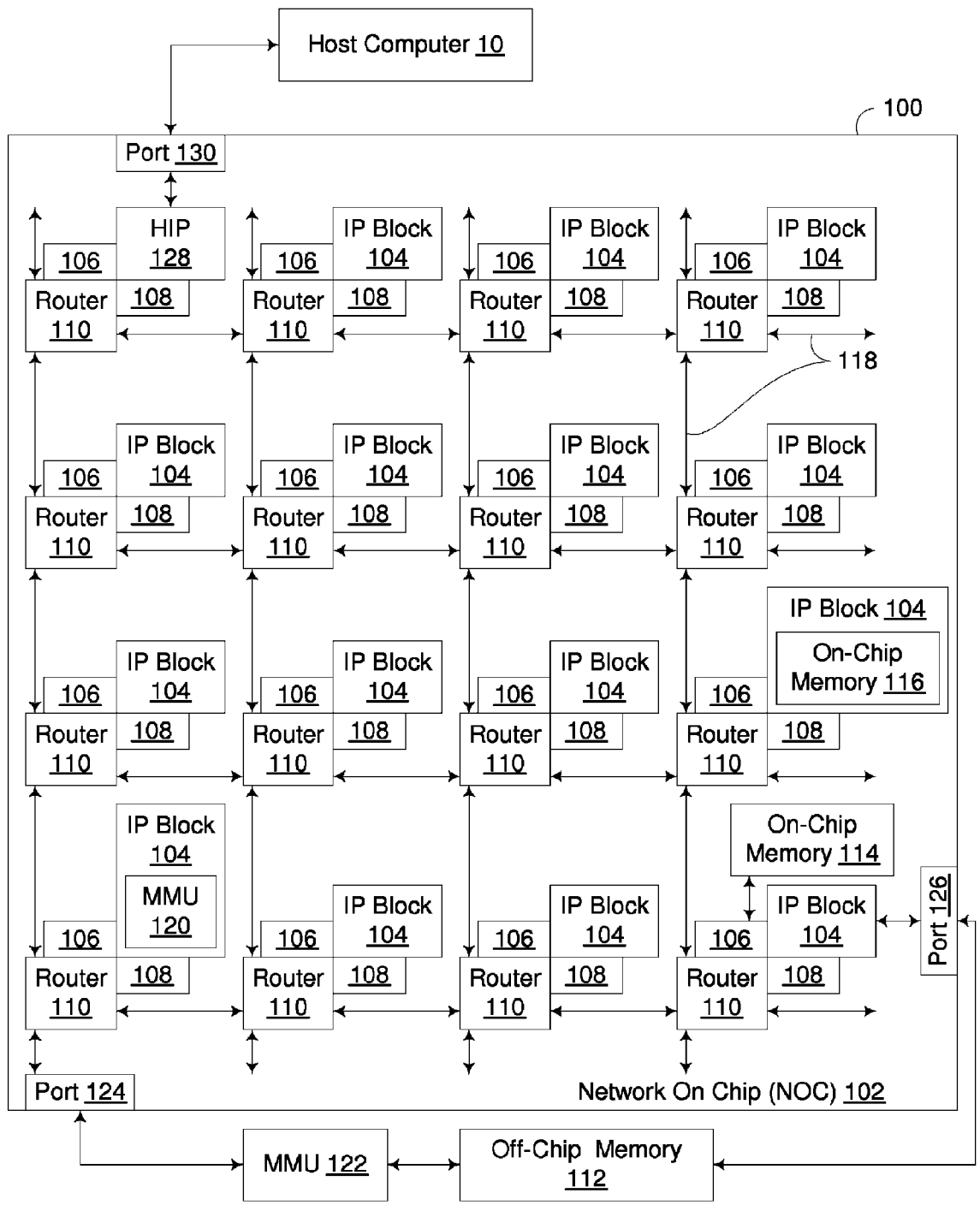
FIG. 2 is a block diagram of an exemplary NOC implemented in the computer of FIG. 1.

For further explanation, FIG. 2 sets forth a functional block diagram of an example NOC 102 according to embodiments of the present invention. The NOC in FIG. 2 is implemented on a 'chip' 100, that is, on an integrated circuit. NOC 102 includes integrated processor ('IP') blocks 104, routers 110, memory communications controllers 106, and network interface controllers 108 grouped into interconnected nodes. Each IP block 104 is adapted to a router 110 through a memory communications controller 106 and a network interface controller 108. Each memory communications controller controls communications between an IP block and memory, and each network interface controller 108 controls inter-IP block communications through routers 110.

In NOC 102, each IP block represents a reusable unit of synchronous or asynchronous logic design used as a building block for data processing within the NOC. The term 'IP block' is sometimes expanded as 'intellectual property block,' effectively designating an IP block as a design that is owned by a party, that is the intellectual property of a party, to be licensed to other users or designers of semiconductor circuits. In the scope of the present invention, however, there is no requirement that IP blocks be subject to any particular ownership, so the term is always expanded in this specification as 'integrated processor block.' IP blocks, as specified here, are reusable units of logic, cell, or chip layout design that may or may not be the subject of intellectual property. IP blocks are logic cores that can be formed as ASIC chip designs or FPGA logic designs.

One way to describe IP blocks by analogy is that IP blocks are for NOC design what a library is for computer programming or a discrete integrated circuit component is for printed circuit board design. In NOCs consistent with embodiments of the present invention, IP blocks may be implemented as generic gate netlists, as complete special purpose or general purpose microprocessors, or in other ways as may occur to those of skill in the art. A netlist is a Boolean-algebra representation (gates, standard cells) of an IP blocks logical-function, analogous to an assembly-code listing for a high-level program application. NOCs also may be implemented, for example, in synthesizable form, described in a hardware description language such as VERILOG or VHDL. In addition to netlist and synthesizable implementation, NOCs also may be delivered in lower-level, physical descriptions. Analog IP block elements such as SERDES, PLL, DAC, ADC, and so on, may be distributed in a transistor-layout format such as GDSII. Digital elements of IP blocks are sometimes offered in layout format as well. It will also be appreciated that IP blocks, as well as other logic circuitry implemented consistent with the invention may be distributed in the form of computer data files, e.g., logic definition program code, that define at various levels of detail the functionality and/or layout of the circuit arrangements implementing such logic. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of computer readable or signal bearing media being used to actually carry out the distribution. Examples of computer readable or signal bearing media include, but are not limited to, physical, recordable type media such as volatile and non-volatile memory devices, floppy disks, hard disk drives, CD-ROMs, and DVDs (among others), and transmission type media such as digital and analog communication links.

Each IP block 104 in the example of FIG. 2 is adapted to a router 110 through a memory communications controller 106. Each memory communication controller is an aggregation of synchronous and asynchronous logic circuitry adapted to provide data communications between an IP block and memory. Examples of such communications between IP blocks and memory include memory load instructions and memory store instructions. The memory communications controllers 106 are described in more detail below with reference to FIG. 3. Each IP block 104 is also adapted to a router 110 through a network interface controller 108, which controls communications through routers 110 between IP blocks 104. Examples of communications between IP blocks include messages carrying data and instructions for processing the data among IP blocks in parallel applications and in pipelined applications. The network interface controllers 108 are also described in more detail below with reference to FIG. 3.

Routers 110, and the corresponding links 118 therebetween, implement the network operations of the NOC. The links 118 may be packet structures implemented on physical, parallel wire buses connecting all the routers. That is, each link may be implemented on a wire bus wide enough to accommodate simultaneously an entire data switching packet, including all header information and payload data. If a packet structure includes 64 bytes, for example, including an eight byte header and 56 bytes of payload data, then the wire bus subtending each link is 64 bytes wide, 512 wires. In addition, each link may be bi-directional, so that if the link packet structure includes 64 bytes, the wire bus actually contains 1024 wires between each router and each of its neighbors in the network. In such an implementation, a message could include more than one packet, but each packet would fit precisely onto the width of the wire bus. In the alternative, a link may be implemented on a wire bus that is only wide enough to accommodate a portion of a packet, such that a packet would be broken up into multiple beats, e.g., so that if a link is implemented as 16 bytes in width, or 128 wires, a 64 byte packet could be broken into four beats. It will be appreciated that different implementations may used different bus widths based on practical physical limits as well as desired performance characteristics. If the connection between the router and each section of wire bus is referred to as a port, then each router includes five ports, one for each of four directions of data transmission on the network and a fifth port for adapting the router to a particular IP block through a memory communications controller and a network interface controller.

Each memory communications controller 106 controls communications between an IP block and memory. Memory can include off-chip main RAM 112, memory 114 connected directly to an IP block through a memory communications controller 106, on-chip memory enabled as an IP block 116, and on-chip caches. In NOC 102, either of the on-chip memories 114, 116, for example, may be implemented as on-chip cache memory. All these forms of memory can be disposed in the same address space, physical addresses or virtual addresses, true even for the memory attached directly to an IP block. Memory addressed messages therefore can be entirely bidirectional with respect to IP blocks, because such memory can be addressed directly from any IP block anywhere on the network. Memory 116 on an IP block can be addressed from that IP block or from any other IP block in the NOC. Memory 114 attached directly to a memory communication controller can be addressed by the IP block that is adapted to the network by that memory communication controller—and can also be addressed from any other IP block anywhere in the NOC.

NOC 102 includes two memory management units ('MMUs') 120, 122, illustrating two alternative memory architectures for NOCs consistent with embodiments of the present invention. MMU 120 is implemented within an IP block, allowing a processor within the IP block to operate in virtual memory while allowing the entire remaining architecture of the NOC to operate in a physical memory address space. MMU 122 is implemented off-chip, connected to the NOC through a data communications port 124. The port 124 includes the pins and other interconnections required to conduct signals between the NOC and the MMU, as well as sufficient intelligence to convert message packets from the NOC packet format to the bus format required by the external MMU 122. The external location of the MMU means that all processors in all IP blocks of the NOC can operate in virtual memory address space, with all conversions to physical addresses of the off-chip memory handled by the off-chip MMU 122.

In addition to the two memory architectures illustrated by use of the MMUs 120, 122, data communications port 126 illustrates a third memory architecture useful in NOCs capable of being utilized in embodiments of the present invention. Port 126 provides a direct connection between an IP block 104 of the NOC 102 and off-chip memory 112. With no MMU in the processing path, this architecture provides utilization of a physical address space by all the IP blocks of the NOC. In sharing the address space bi-directionally, all the IP blocks of the NOC can access memory in the address space by memory-addressed messages, including loads and stores, directed through the IP block connected directly to the port 126. The port 126 includes the pins and other interconnections required to conduct signals between the NOC and the off-chip memory 112, as well as sufficient intelligence to convert message packets from the NOC packet format to the bus format required by the off-chip memory 112.

In the example of FIG. 2, one of the IP blocks is designated a host interface processor 128. A host interface processor 128 provides an interface between the NOC and a host computer 10 in which the NOC may be installed and also provides data processing services to the other IP blocks on the NOC, including, for example, receiving and dispatching among the IP blocks of the NOC data processing requests from the host computer. A NOC may, for example, implement a video graphics adapter 26 or a coprocessor 28 on a larger computer 10 as described above with reference to FIG. 1. In the example of FIG. 2, the host interface processor 128 is connected to the larger host computer through a data communications port 130. The port 130 includes the pins and other interconnections required to conduct signals between the NOC and the host computer, as well as sufficient intelligence to convert message packets from the NOC to the bus format required by the host computer 10. In the example of the NOC coprocessor in the computer of FIG. 1, such a port would provide data communications format translation between the link structure of the NOC coprocessor 28 and the protocol required for the front side bus 36 between the NOC coprocessor 28 and the bus adapter 18.

Figure 3:
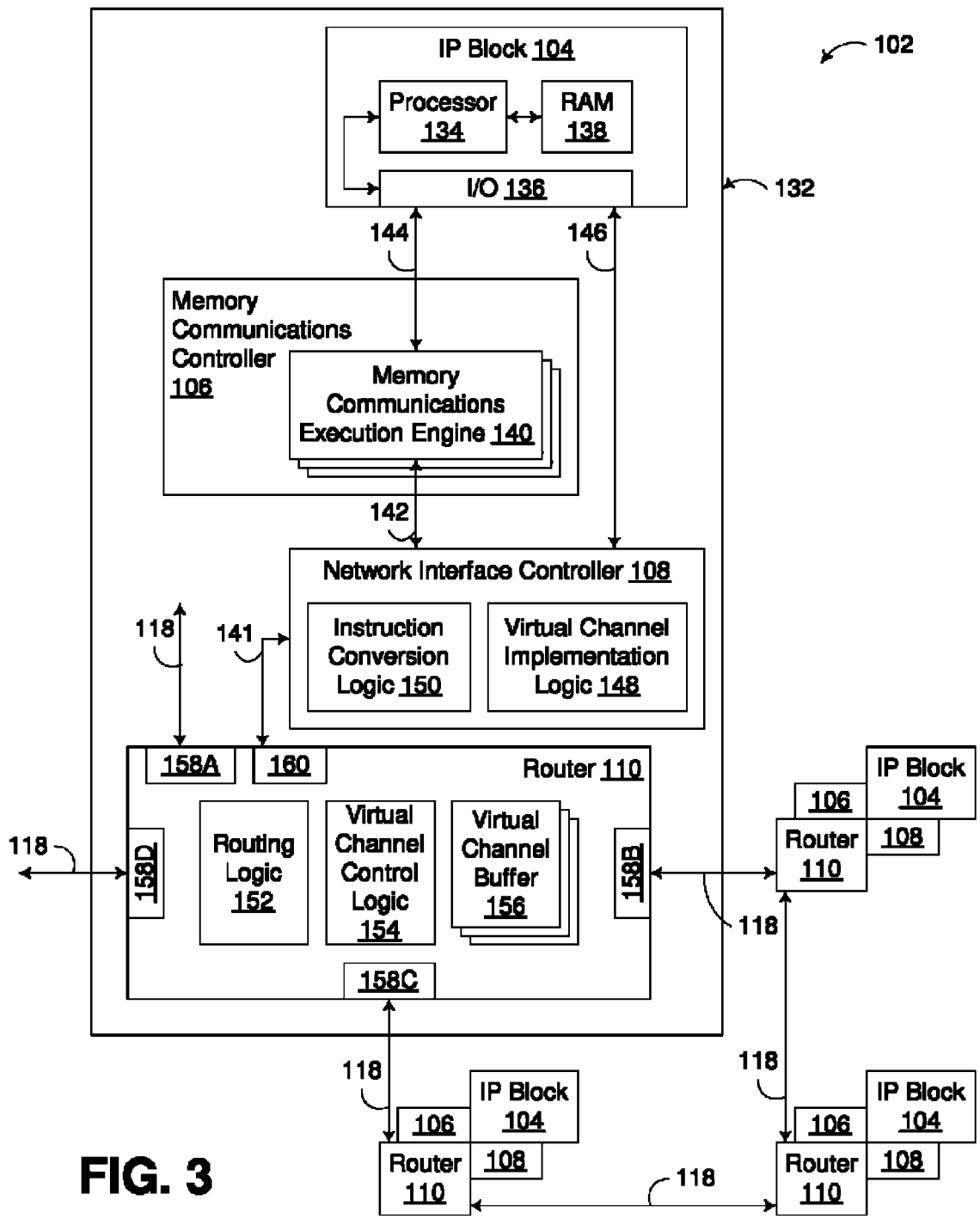
FIG. 3 is a block diagram illustrating in greater detail an exemplary implementation of a node from the NOC of FIG. 2.

FIG. 3 next illustrates a functional block diagram illustrating in greater detail the components implemented within an IP block 104, memory communications controller 106, network interface controller 108 and router 110 in NOC 102, collectively illustrated at 132. IP block 104 includes a computer processor 134 and I/O functionality 136. In this example, computer memory is represented by a segment of random access memory ('RAM') 138 in IP block 104. The memory, as described above with reference to FIG. 2, can occupy segments of a physical address space whose contents on each IP block are addressable and accessible from any IP block in the NOC. The processors 134, I/O capabilities 136, and memory 138 in each IP block effectively implement the IP blocks as generally programmable microcomputers. As explained above, however, in the scope of the present invention, IP blocks generally represent reusable units of synchronous or asynchronous logic used as building blocks for data processing within a NOC. Implementing IP blocks as generally programmable microcomputers, therefore, although a common embodiment useful for purposes of explanation, is not a limitation of the present invention.

In NOC 102 of FIG. 3, each memory communications controller 106 includes a plurality of memory communications execution engines 140. Each memory communications execution engine 140 is enabled to execute memory communications instructions from an IP block 104, including bidirectional memory communications instruction flow 141, 142, 144 between the network and the IP block 104. The memory communications instructions executed by the memory communications controller may originate, not only from the IP block adapted to a router through a particular memory communications controller, but also from any IP block 104 anywhere in NOC 102. That is, any IP block in the NOC can generate a memory communications instruction and transmit that memory communications instruction through the routers of the NOC to another memory communications controller associated with another IP block for execution of that memory communications instruction. Such memory communications instructions can include, for example, translation lookaside buffer control instructions, cache control instructions, barrier instructions, and memory load and store instructions.

Each memory communications execution engine 140 is enabled to execute a complete memory communications instruction separately and in parallel with other memory communications execution engines. The memory communications execution engines implement a scalable memory transaction processor optimized for concurrent throughput of memory communications instructions. Memory communications controller 106 supports multiple memory communications execution engines 140 all of which run concurrently for simultaneous execution of multiple memory communications instructions. A new memory communications instruction is allocated by the memory communications controller 106 to a memory communications engine 140 and memory communications execution engines 140 can accept multiple response events simultaneously. In this example, all of the memory communications execution engines 140 are identical. Scaling the number of memory communications instructions that can be handled simultaneously by a memory communications controller 106, therefore, is implemented by scaling the number of memory communications execution engines 140.

In NOC 102 of FIG. 3, each network interface controller 108 is enabled to convert communications instructions from command format to network packet format for transmission among the IP blocks 104 through routers 110. The communications instructions may be formulated in command format by the IP block 104 or by memory communications controller 106 and provided to the network interface controller 108 in command format. The command format may be a native format that conforms to architectural register files of IP block 104 and memory communications controller 106. The network packet format is typically the format required for transmission through routers 110 of the network. Each such message is composed of one or more network packets. Examples of such communications instructions that are converted from command format to packet format in the network interface controller include memory load instructions and memory store instructions between IP blocks and memory. Such communications instructions may also include communications instructions that send messages among IP blocks carrying data and instructions for processing the data among IP blocks in parallel applications and in pipelined applications.

In NOC 102 of FIG. 3, each IP block is enabled to send memory-address-based communications to and from memory through the IP block's memory communications controller and then also through its network interface controller to the network. A memory-address-based communications is a memory access instruction, such as a load instruction or a store instruction, that is executed by a memory communication execution engine of a memory communications controller of an IP block. Such memory-address-based communications typically originate in an IP block, formulated in command format, and handed off to a memory communications controller for execution.

Many memory-address-based communications are executed with message traffic, because any memory to be accessed may be located anywhere in the physical memory address space, on-chip or off-chip, directly attached to any memory communications controller in the NOC, or ultimately accessed through any IP block of the NOC—regardless of which IP block originated any particular memory-address-based communication. Thus, in NOC 102, all memory-address-based communications that are executed with message traffic are passed from the memory communications controller to an associated network interface controller for conversion from command format to packet format and transmission through the network in a message. In converting to packet format, the network interface controller also identifies a network address for the packet in dependence upon the memory address or addresses to be accessed by a memory-address-based communication. Memory address based messages are addressed with memory addresses. Each memory address is mapped by the network interface controllers to a network address, typically the network location of a memory communications controller responsible for some range of physical memory addresses. The network location of a memory communication controller 106 is naturally also the network location of that memory communication controller's associated router 110, network interface controller 108, and IP block 104. The instruction conversion logic 150 within each network interface controller is capable of converting memory addresses to network addresses for purposes of transmitting memory-address-based communications through routers of a NOC.

Upon receiving message traffic from routers 110 of the network, each network interface controller 108 inspects each packet for memory instructions. Each packet containing a memory instruction is handed to the memory communications controller 106 associated with the receiving network interface controller, which executes the memory instruction before sending the remaining payload of the packet to the IP block for further processing. In this way, memory contents are always prepared to support data processing by an IP block before the IP block begins execution of instructions from a message that depend upon particular memory content.

In NOC 102 of FIG. 3, each IP block 104 is enabled to bypass its memory communications controller 106 and send inter-IP block, network-addressed communications 146 directly to the network through the IP block's network interface controller 108. Network-addressed communications are messages directed by a network address to another IP block. Such messages transmit working data in pipelined applications, multiple data for single program processing among IP blocks in a SIMD application, and so on, as will occur to those of skill in the art. Such messages are distinct from memory-address-based communications in that they are network addressed from the start, by the originating IP block which knows the network address to which the message is to be directed through routers of the NOC. Such network-addressed communications are passed by the IP block through I/O functions 136 directly to the IP block's network interface controller in command format, then converted to packet format by the network interface controller and transmitted through routers of the NOC to another IP block. Such network-addressed communications 146 are bi-directional, potentially proceeding to and from each IP block of the NOC, depending on their use in any particular application. Each network interface controller, however, is enabled to both send and receive such communications to and from an associated router, and each network interface controller is enabled to both send and receive such communications directly to and from an associated IP block, bypassing an associated memory communications controller 106.

Each network interface controller 108 in the example of FIG. 3 is also enabled to implement virtual channels on the network, characterizing network packets by type. Each network interface controller 108 includes virtual channel implementation logic 148 that classifies each communication instruction by type and records the type of instruction in a field of the network packet format before handing off the instruction in packet form to a router 110 for transmission on the NOC. Examples of communication instruction types include inter-IP block network-address-based messages, request messages, responses to request messages, invalidate messages directed to caches; memory load and store messages; and responses to memory load messages, etc.

Each router 110 in the example of FIG. 3 includes routing logic 152, virtual channel control logic 154, and virtual channel buffers 156. The routing logic typically is implemented as a network of synchronous and asynchronous logic that implements a data communications protocol stack for data communication in the network formed by the routers 110, links 118, and bus wires among the routers. Routing logic 152 includes the functionality that readers of skill in the art might associate in off-chip networks with routing tables, routing tables in at least some embodiments being considered too slow and cumbersome for use in a NOC. Routing logic implemented as a network of synchronous and asynchronous logic can be configured to make routing decisions as fast as a single clock cycle. The routing logic in this example routes packets by selecting a port for forwarding each packet received in a router. Each packet contains a network address to which the packet is to be routed.

In describing memory-address-based communications above, each memory address was described as mapped by network interface controllers to a network address, a network location of a memory communications controller. The network location of a memory communication controller 106 is naturally also the network location of that memory communication controller's associated router 110, network interface controller 108, and IP block 104. In inter-IP block, or network-address-based communications, therefore, it is also typical for application-level data processing to view network addresses as the location of an IP block within the network formed by the routers, links, and bus wires of the NOC. FIG. 2 illustrates that one organization of such a network is a mesh of rows and columns in which each network address can be implemented, for example, as either a unique identifier for each set of associated router, IP block, memory communications controller, and network interface controller of the mesh or x, y coordinates of each such set in the mesh.

In NOC 102 of FIG. 3, each router 110 implements two or more virtual communications channels, where each virtual communications channel is characterized by a communication type. Communication instruction types, and therefore virtual channel types, include those mentioned above: inter-IP block network-address-based messages, request messages, responses to request messages, invalidate messages directed to caches; memory load and store messages; and responses to memory load messages, and so on. In support of virtual channels, each router 110 in the example of FIG. 3 also includes virtual channel control logic 154 and virtual channel buffers 156. The virtual channel control logic 154 examines each received packet for its assigned communications type and places each packet in an outgoing virtual channel buffer for that communications type for transmission through a port to a neighboring router on the NOC.

Each virtual channel buffer 156 has finite storage space. When many packets are received in a short period of time, a virtual channel buffer can fill up—so that no more packets can be put in the buffer. In other protocols, packets arriving on a virtual channel whose buffer is full would be dropped. Each virtual channel buffer 156 in this example, however, is enabled with control signals of the bus wires to advise surrounding routers through the virtual channel control logic to suspend transmission in a virtual channel, that is, suspend transmission of packets of a particular communications type. When one virtual channel is so suspended, all other virtual channels are unaffected—and can continue to operate at full capacity. The control signals are wired all the way back through each router to each router's associated network interface controller 108. Each network interface controller is configured to, upon receipt of such a signal, refuse to accept, from its associated memory communications controller 106 or from its associated IP block 104, communications instructions for the suspended virtual channel. In this way, suspension of a virtual channel affects all the hardware that implements the virtual channel, all the way back up to the originating IP blocks.

One effect of suspending packet transmissions in a virtual channel is that no packets are ever dropped. When a router encounters a situation in which a packet might be dropped in some unreliable protocol such as, for example, the Internet Protocol, the routers in the example of FIG. 3 may suspend by their virtual channel buffers 156 and their virtual channel control logic 154 all transmissions of packets in a virtual channel until buffer space is again available, eliminating any need to drop packets. The NOC of FIG. 3, therefore, may implement highly reliable network communications protocols with an extremely thin layer of hardware.

The example NOC of FIG. 3 may also be configured to maintain cache coherency between both on-chip and off-chip memory caches. Each NOC can support multiple caches each of which operates against the same underlying memory address space. For example, caches may be controlled by IP blocks, by memory communications controllers, or by cache controllers external to the NOC. Either of the on-chip memories 114, 116 in the example of FIG. 2 may also be implemented as an on-chip cache, and, within the scope of the present invention, cache memory can be implemented off-chip also.

Each router 110 illustrated in FIG. 3 includes five ports, four ports 158A-D connected through bus wires 118 to other routers and a fifth port 160 connecting each router to its associated IP block 104 through a network interface controller 108 and a memory communications controller 106. As can be seen from the illustrations in FIGS. 2 and 3, the routers 110 and the links 118 of the NOC 102 form a mesh network with vertical and horizontal links connecting vertical and horizontal ports in each router. In the illustration of FIG. 3, for example, ports 158A, 158C and 160 are termed vertical ports, and ports 158B and 158D are termed horizontal ports.

Figure 4:
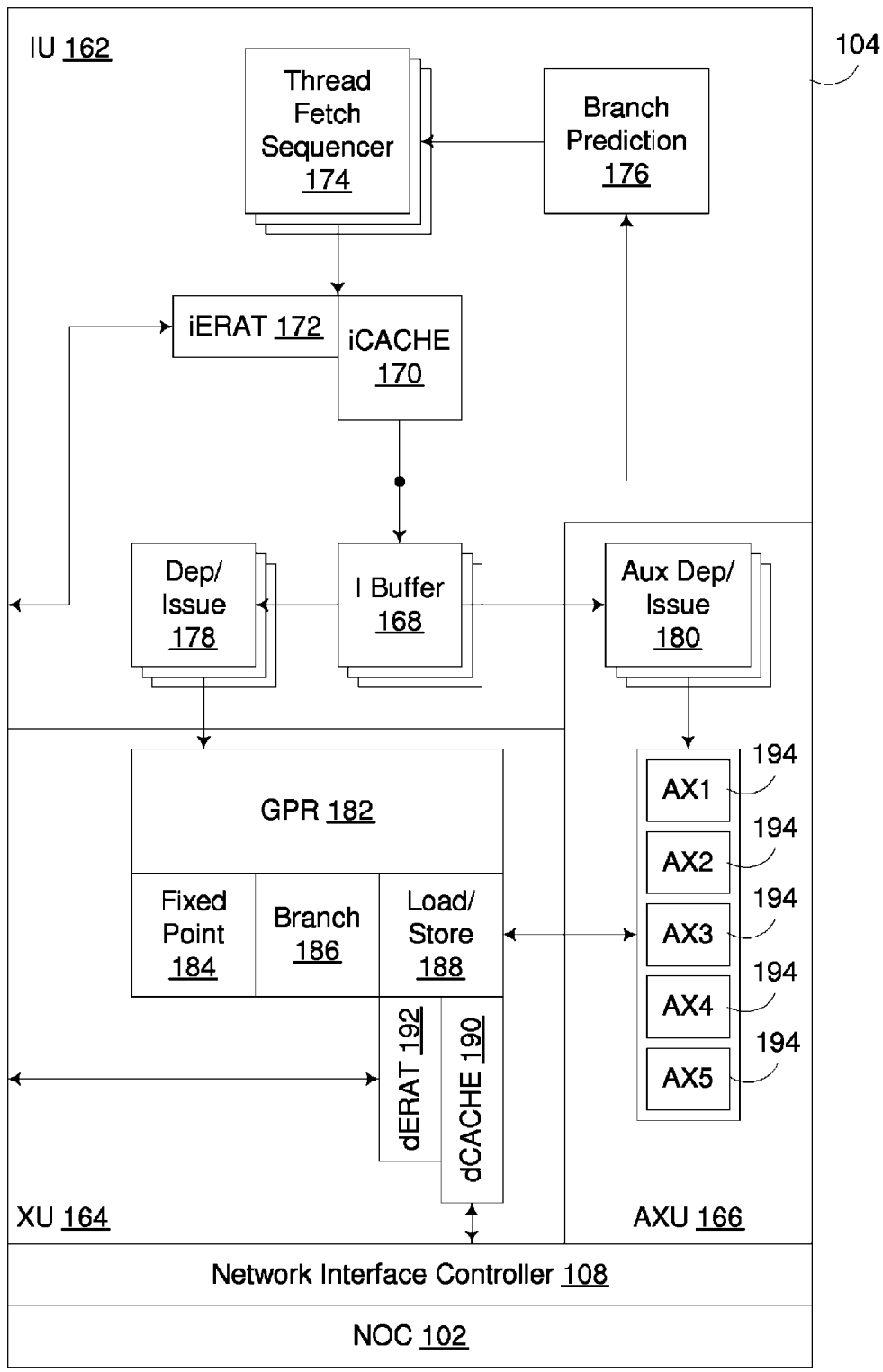
FIG. 4 is a block diagram illustrating an exemplary implementation of an IP block from the NOC of FIG. 2.

FIG. 4 next illustrates in another manner one exemplary implementation of an IP block 104 consistent with the invention, implemented as a processing element partitioned into an instruction unit (IU) 162, execution unit (XU) 164 and auxiliary execution unit (AXU) 166. In the illustrated implementation, IU 162 includes a plurality of instruction buffers 168 that receive instructions from an L1 instruction cache (iCACHE) 170. Each instruction buffer 168 is dedicated to one of a plurality, e.g., four, symmetric multithreaded (SMT) hardware threads. An effective-to-real translation unit (iERAT) 172 is coupled to iCACHE 170, and is used to translate instruction fetch requests from a plurality of thread fetch sequencers 174 into real addresses for retrieval of instructions from lower order memory. Each thread fetch sequencer 174 is dedicated to a particular hardware thread, and is used to ensure that instructions to be executed by the associated thread is fetched into the iCACHE for dispatch to the appropriate execution unit. As also shown in FIG. 4, instructions fetched into instruction buffer 168 may also be monitored by branch prediction logic 176, which provides hints to each thread fetch sequencer 174 to minimize instruction cache misses resulting from branches in executing threads.

IU 162 also includes a dependency/issue logic block 178 dedicated to each hardware thread, and configured to resolve dependencies and control the issue of instructions from instruction buffer 168 to XU 164. In addition, in the illustrated embodiment, separate dependency/issue logic 180 is provided in AXU 166, thus enabling separate instructions to be concurrently issued by different threads to XU 164 and AXU 166. In an alternative embodiment, logic 180 may be disposed in IU 162, or may be omitted in its entirety, such that logic 178 issues instructions to AXU 166.

XU 164 is implemented as a fixed point execution unit, including a set of general purpose registers (GPR's) 182 coupled to fixed point logic 184, branch logic 186 and load/store logic 188. Load/store logic 188 is coupled to an L1 data cache (dCACHE) 190, with effective to real translation provided by dERAT logic 192. XU 164 may be configured to implement practically any instruction set, e.g., all or a portion of a 32b or 64b POWERPC instruction set.

AXU 166 operates as an auxiliary execution unit including dedicated dependency/issue logic 180 along with one or more execution blocks 194. AXU 166 may include any number of execution blocks, and may implement practically any type of execution unit, e.g., a floating point unit, or one or more specialized execution units such as encryption/decryption units, coprocessors, vector processing units, graphics processing units, XML processing units, etc. In the illustrated embodiment, AXU 166 includes a high speed auxiliary interface to XU 164, e.g., to support direct moves between AXU architected state and XU architected state.

Communication with IP block 104 may be managed in the manner discussed above in connection with FIG. 2, via network interface controller 108 coupled to NOC 102. Address-based communication, e.g., to access L2 cache memory, may be provided, along with message-based communication. For example, each IP block 104 may include a dedicated in box and/or out box in order to handle inter-node communications between IP blocks.

Embodiments of the present invention may be implemented within the hardware and software environment described above in connection with FIGS. 1-4. However, it will be appreciated by one of ordinary skill in the art having the benefit of the instant disclosure that the invention may be implemented in a multitude of different environments, and that other modifications may be made to the aforementioned hardware and software embodiment without departing from the spirit and scope of the invention. As such, the invention is not limited to the particular hardware and software environment disclosed herein.

Execution Unit With Early Exit of Iterative Refinement Algorithm

Figure 5:
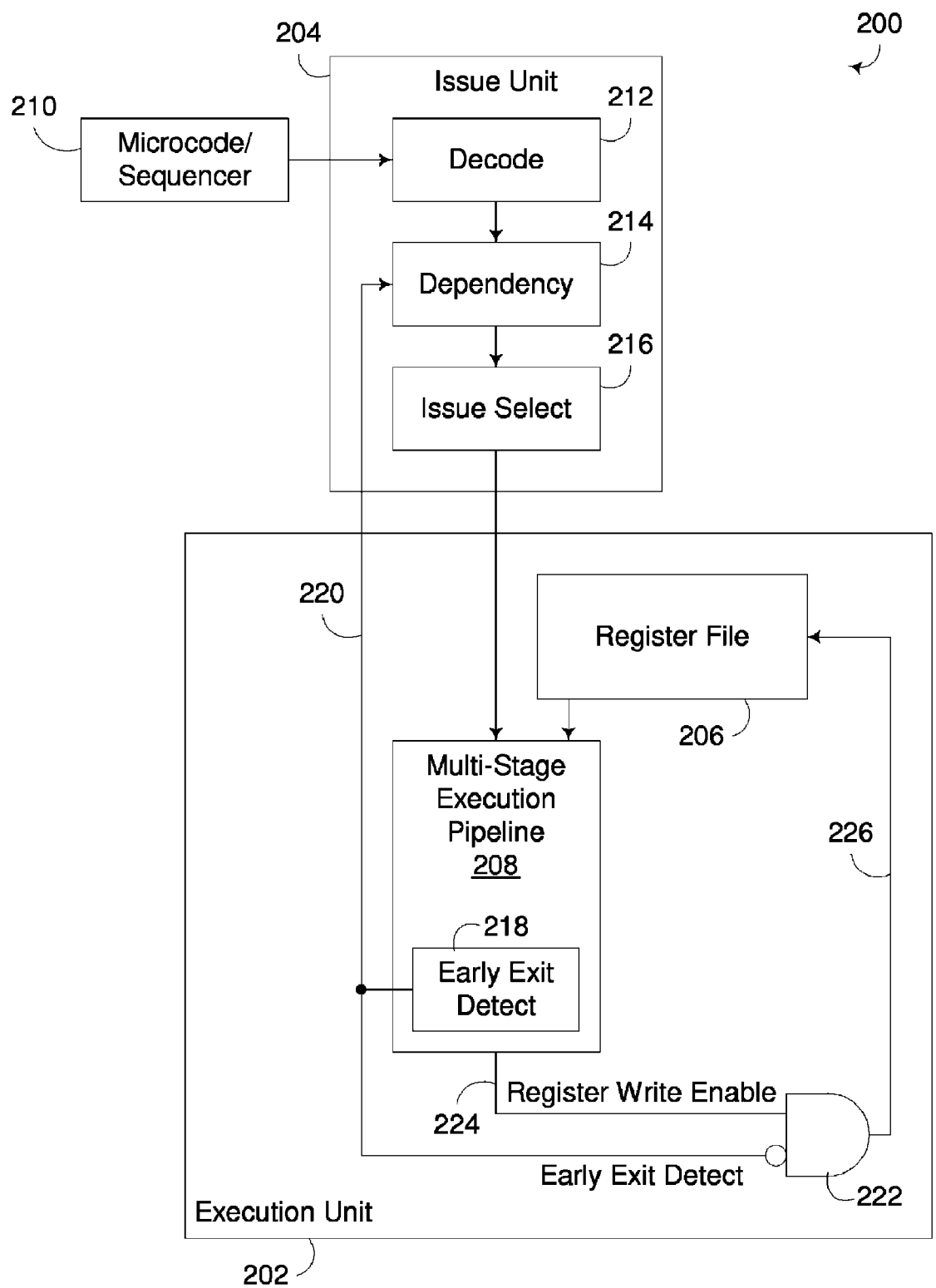
FIG. 5 is a block diagram of a processing unit configured to perform early exit of an iterative refinement algorithm in a manner consistent with the invention, and capable of being implemented within an IP block from the NOC of FIG. 2.

Turning now to FIG. 5, this figure illustrates an exemplary processing unit 200 incorporating an execution unit 202 and issue unit 204 supporting early exit of an iterative refinement algorithm consistent with the invention. Processing unit 200 may be implemented, for example, in an IP block such as an IP block 104 from FIGS. 1-4. In the alternative, processing unit 200 may be implemented in other processor architectures that issue and execute instructions, including single or multi-core microprocessors or microcontrollers.

Processing unit 200 assists in decreasing the latency of an iterative refinement algorithm in early exit cases by disabling dependency logic for subsequent instructions in the algorithm and disabling their write enable signals to a register array when an early exit condition has been detected to effectively disable write back to the register file by such instructions. By doing so, the subsequent instructions are able to flow through a multi-stage execution pipeline without the delays that would otherwise be required in order to comply with dependency requirements, thereby accelerating the completion of the algorithm.

Execution unit 202 processes instructions issued to the execution unit by issue unit 204, and includes a register file 206 coupled to a multi-stage execution pipeline 208 capable of processing data stored in register file 206 based upon the instructions issued by issue logic 204, and storing target data back to the register file. Execution unit 202 may be implemented as a number of different types of execution units, e.g., floating point units, fixed point units, or specialized execution units such as graphics processing units, encryption/decryption units, coprocessors, XML processing units, etc., and may be implemented either as a vector or scalar-based unit. In one implementation, for example, multi-stage execution pipeline 208 is a vector floating point execution pipeline, and register file 206 is a vector register file 206 storing vectors of floating point values in a set of vector registers.

Instructions are decoded in issue unit 204 by decode logic 212, and dependency conditions (i.e., conditions where a newer instruction must be stalled until the result from an older, executing instruction is ready) are detected in dependency logic 214. The instructions, once any dependencies are resolved, are selected for issue, and issued, by issue select logic 216. Issue unit 204 is illustrated in FIG. 5 as a single threaded issue unit, although in some implementations, issue unit 204 may be a multithreaded issue unit capable of receiving instructions from multiple threads and scheduling the execution of such instructions.

In some implementations, an iterative refinement algorithm may be implemented directly in the program code instruction stream for a program being executed by processing unit 200. In the alternative, it may be desirable to implement an iterative refinement algorithm using a microcode routine, whereby the instructions may be fed to issue unit 204 by microcode or sequencer logic 210. In the latter implementation, the input value or values for the iterative refinement are supplied by the program being executed, with the actual implementation of the iterative refinement algorithm performed by logic 210, similar to the operation of a function or subroutine call in software.

Processing unit 200 in the illustrated embodiment implements early exit of an iterative refinement algorithm through the inclusion of additional circuitry to execution unit 202 (block 218) to detect when an early exit can occur. When such a condition is met, an early exit detect signal 220 is asserted, resulting in two state changes in the processing unit. First, assertion of early exit detect signal 220 is used to disable read after write dependency stalls by dependency logic 214 such that subsequent instructions in the iterative refinement algorithm are allowed to issue irrespective of any read after write dependencies.

Second, assertion of early exit detect signal 220 is used to disable write backs to the register file by subsequent instructions in the iterative refinement algorithm so that the execution of such instructions in the execution pipeline 208 does not alter the architected state of the processing unit, i.e., so that the subsequent instructions are effectively null operations. Write backs are disabled through the use of write back disable logic 222, illustrated in FIG. 5 as an AND gate, which gates a register write enable signal 224 by the early exit detect signal 220. Signal 220 is provided to an inverted input of AND gate 222, such that, when signal 220 is not asserted, register write enable signal 224 is simply passed through to register file 206 to enable write backs to the register file by instructions processed by multi-stage execution pipeline 208 in a manner well known in the art. On the other hand, when signal 220 is asserted, AND gate 222 is driven to a logic "0," and register write enable signal 224 becomes a "don't care," whereby register write enable signal 224 is effectively prevented from enabling write backs to register file 206.

As such, once the early exit detect signal 220 is asserted, the current iterative refinement algorithm is completed with the write back to the register file and the stall of each subsequent instruction disabled. Thus, any instruction with a dependency that is processed by execution unit 202 after assertion of the early exit detect signal will be processed with write backs to the register file disabled, and with the stall of the instruction with the dependency disabled by the dependency logic such that execution of the iterative refinement algorithm is completed with the write back to the register file and the stall of the instruction with the dependency disabled. It will be appreciated that write backs may be disabled for instructions having the read after write dependencies, as well as for instructions not having such dependencies.

Figure 6:
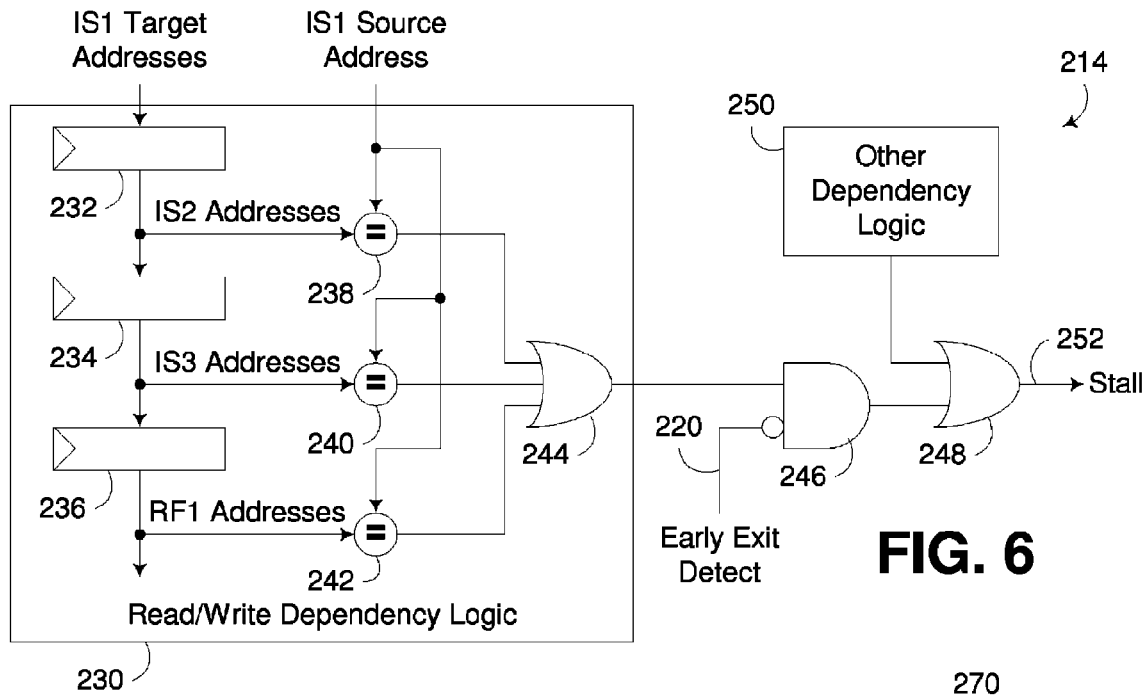
FIG. 6 is a block diagram of the dependency logic referenced in FIG. 5.

FIG. 6 illustrates an exemplary implementation of dependency logic 214 suitable for implementing early exit of an iterative refinement algorithm consistent with the invention. Dependency logic 214 includes read after write dependency logic 230 including a set of latches 232, 234, 236 that stage out the target addresses of older instructions, currently in pipeline stages IS2, IS3 and RF1, respectively (in the illustrated implementation, each IS* stage is an instruction issue stage, each RF* stage is a register file operand reading stage, and each EX* stage is an instruction execution stage). A series of comparators 238, 240, 242 compare these target addresses with the source address of the current instruction in IS1, and each is asserted whenever a match is detected. An OR gate 244 collects the outputs of the comparators 238, 240, 242 and ordinarily asserts a stall condition whenever any match is detected by one of the comparators. In the illustrated implementation, however, the output of OR gate 244 is gated by an AND gate 246, which receives via an inverted input the early exit detect signal 220 output by block 218 of FIG. 5. Thus, when signal 220 is not asserted, the output of OR gate 244 is passed through AND gate 246; however, when signal 220 is asserted, AND gate 246 is driven to a logic "0," and the output of OR gate 244 becomes a "don't care," whereby OR gate 244 is effectively prevented from asserting read after write dependency stalls.

In some implementations, AND gate 246 may disable all dependency stalls. In the implementation illustrated in FIG. 6, on the other hand, dependency logic 214 may include other dependency detection logic 250 for use in detecting other types of dependencies, e.g., write after write dependencies, where a newer instruction with a lower pipeline latency than an older instruction that writes the same target address in the register file is stalled to ensure that the writes occur in proper order. Detection of such other dependencies may remain enabled even when read after write dependency detection is disabled. For example, as illustrated in FIG. 5, the read after write dependency stall signal output by read after write dependency logic 230 may be logically OR'd with additional stall signals output by other dependency logic by an OR gate 248, resulting in a single stall signal 252 output from dependency logic 214.

Figure 7:
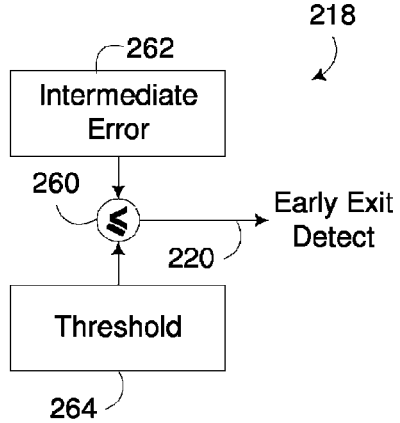
FIG. 7 is a block diagram of the early exit detect logic referenced in FIG. 5.

FIG. 7 next illustrates an exemplary implementation of early exit detect logic 218, including a comparator 260 that compares an intermediate error value 262 with a threshold 264, and that asserts early exit detect signal 220 whenever the intermediate error value is less than or equal to the threshold. It will be appreciated that the threshold 264 may be static or may be programmable. In addition, in some implementations logic 218 may include logic for resetting the intermediate error and/or deasserting early exit detect signal 220 at the completion of the iterative refinement algorithm. For example, an instruction with a unique opcode may be provided and executed at the completion of an iterative refinement algorithm to trigger a reset of the early exit detect. Alternatively, a microcode unit is used to implement the algorithm, the unit may trigger a reset of the early exit detect signal upon encountering the last instruction in the routine. It will be appreciated that other manners of detecting an early exit condition and/or other manners of detecting the completion of an iterative refinement algorithm and resetting the early detect condition, may be used in the alternative.

Figure 8:
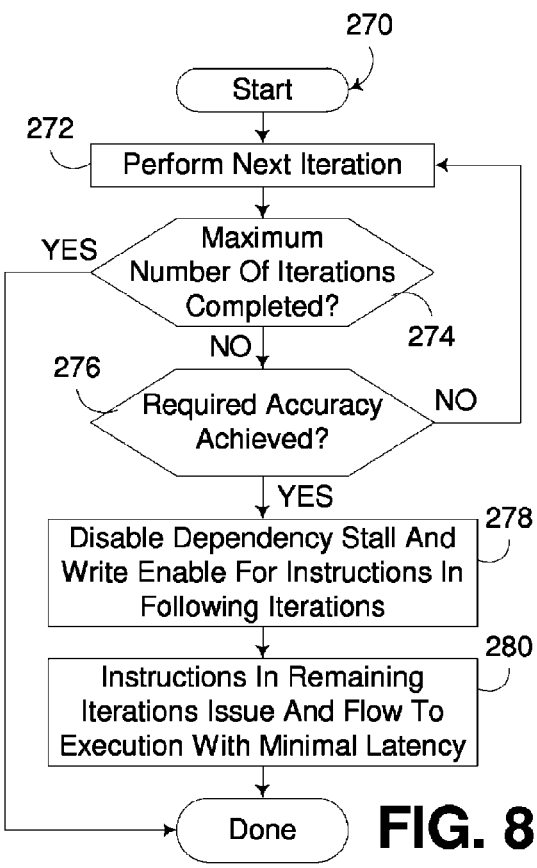
FIG. 8 is a flowchart illustrating the sequence of operations performed by the processing unit of FIG. 5 during execution of an iterative refinement algorithm consistent with the invention.

Now turning to FIG. 8, an exemplary sequence of operations for performing early exit of an iterative refinement algorithm is illustrated at 270. As shown in block 272, for each iteration of the iterative refinement algorithm, the instructions that implement the iteration are performed to calculate an intermediate result. Next, a determination is made in block 274 as to whether the maximum number of iterations for the algorithm have been completed. If so, the intermediate result is a final result, and the algorithm is complete. If not, block 274 passes control to block 276 to determine whether the required accuracy has been achieved (e.g., by comparing an intermediate error to a threshold, as discussed above in connection with FIG. 6). If no, control returns to block 272 to perform the next iteration of the algorithm. If, however, the required accuracy has been achieved, block 276 passes control to block 278 to disable the read after write dependency stall and the write back enable for the instructions in the iterative refinement algorithm for the remaining iterations of the algorithm (e.g., based upon assertion of early exit detect signal 220 as discussed above in connection with FIGS. 5 and 6. Then, as shown in block 280, the instructions in the remaining iterations of the algorithm issue and flow to the multi-stage execution pipeline with minimal latency, until processing of the algorithm is complete.

Figures 9, 10, 11:
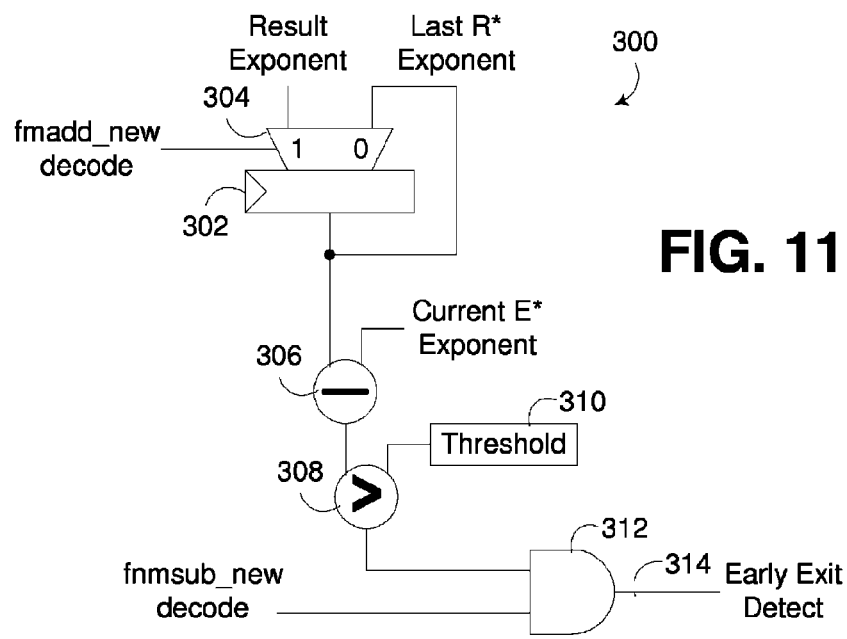
FIGS. 9 and 10 are timing diagrams illustrating the timing of instructions performed by an exemplary iterative refinement algorithm by the processing unit of FIG. 5, respectively without and with performing early exit consistent with the invention.
FIG. 11 is a block diagram of another implementation of the early exit detect logic to that illustrated in FIG. 7.

As an illustration of the potential performance gains that may be achieved via the use of early exit detection as described herein, FIGS. 9 and 10 respectively illustrate timing diagrams showing the execution of an iterative refinement algorithm in an exemplary implementation of processing unit 200 of FIG. 5. These diagrams illustrate the execution of an iterative refinement algorithm such as that of Table I in a processing unit that includes a multi-stage floating point execution pipeline that requires instructions having read after write dependencies to start executing in the fourth cycle after the instructions upon which such instructions are dependent.

FIG. 9, for example, illustrates a timing diagram associated with performing the reciprocal calculations discussed above in connection with Table II, where a three iteration refinement algorithm does not achieve the required accuracy until the third (last) iteration. The "R0" designation in the first cycle represents the fres instruction, while the "R1", "R2" and "R3" designations represent the fmadd instructions and the "E0", "E2" and "E3" designations represent the fnmsub instructions. Of note, with no early exit possible, the complete algorithm requires a total of 22 cycles to complete, with the fnmsub and fmadd instructions in the third iteration (represented at "E2" and "R3") taking a total of 6 cycles. In addition, it will be appreciated that in a conventional system where no early exit is supported, the algorithm will require the full 22 cycles to complete even if the required accuracy is achieved in the first or second iteration.

FIG. 10, on the other hand, illustrates a timing diagram associated with performing the reciprocal calculations discussed above in connection with Table III, where a three iteration refinement algorithm achieves the required accuracy after the second iteration. Via the aforementioned early detect logic, upon completion of the second iteration, the early detect signal is asserted, thus disabling read after write dependencies and write backs to the register file. The instructions in the last iteration, (represented at "E2" and "R3") therefore flow through with no dependency stalls, and taking only a total of 2 cycles. In addition, with write backs disabled for these instructions, the state of the register file and processing unit is not altered as a result of these instructions. The total time required to perform the algorithm is reduced from 22 cycles to 18 cycles, a nearly 20% reduction in latency for the algorithm as a whole, and without requiring the overhead that would otherwise be required for compares and branches to detect the early exit condition.

While an iterative refinement algorithm may be implemented using conventional floating point instructions in some embodiments, it may be desirable in other embodiments to utilize special instructions, or special modes of conventional instructions, in order to facilitate the processing of an iterative refinement algorithm. For example, special instruction decodes may be incorporated into early exit detection logic to assist in detecting when a term in the iterative refinement algorithm has converged to a small enough value such that any arithmetic operation involving that value would have the same effect as if the value were zero.

FIG. 11, for example, illustrates at 300 another implementation of early detect logic suitable for use in processing unit 200 of FIG. 5, where a register 302 stores a result exponent (i.e., an exponent from an intermediate result value) from a prior iteration of the refinement algorithm. A multiplexer 304 normally feeds the contents of register 302 back into the register to retain the prior result exponent, but latches a new result exponent into register 304 in response to a special instruction decode of a special fmadd instruction (referred to herein as "fmadd_new"). The output of register 302 is fed to an adder 306 that subtracts the current E* exponent (i.e., an exponent from an intermediate error value) from the stored result exponent, with this difference supplied to a comparator 308. Comparator 308 compares the difference against a static or programmable threshold 310 such that, whenever the difference exceeds the threshold, a logic "1" value is asserted to one input of an AND gate 312. Gate 312 performs a logical AND with a special instruction decode of a special fnmsub instruction (referred to herein as "fnmsub_new") such that an early exit detect signal 314 is asserted upon the fnmsub_new special instruction decode when the difference exceeds the threshold.

Figures 12, 13:
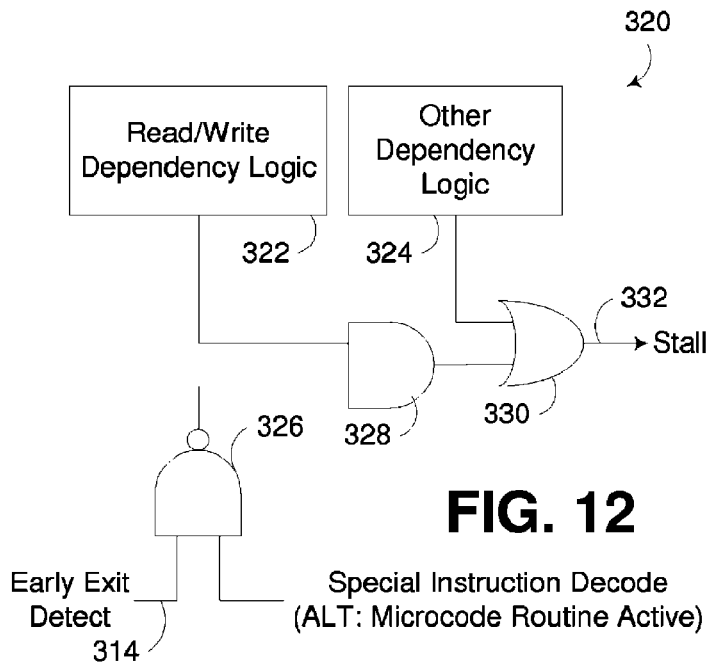
FIG. 12 is a block diagram of another implementation of dependency logic to that illustrated in FIG. 6.
FIG. 13 is a timing diagram illustrating the timing of instructions performed by an exemplary iterative refinement algorithm by a processing unit incorporating the early exit detect logic of FIG. 11.

FIG. 12 illustrates at 320 another implementation of dependency logic suitable for use in connection with early exit detect logic 300. Dependency logic 320 is similar in configuration to dependency logic 214 of FIG. 6, and may include read after write dependency logic 322 and additional dependency logic 324 that is similar or identical to logic 230 and 250 of dependency logic 214. However, early exit detect logic 314 in this implementation is gated by a special instruction decode signal using NAND gate 326. The special instruction decode signal is used so that read after write dependency detection is disabled only for instructions from the iterative refinement algorithm, e.g., by providing each instruction from the algorithm with a special opcode that can be decoded to indicate that the instruction is from the algorithm. For other instructions that do not meet the special instruction decode, read after write dependency detection will continue to be enabled. In the alternative, where the iterative refinement algorithm is implemented using a microcode routine, a control signal may be asserted by the microcode or sequencer logic whenever the microcode routine is currently active to ensure that read after write dependency detection is disabled only for instructions associated with the microcode routine.

To further illustrate the operation of the implementation shown in FIGS. 11-12, Table IV below illustrates program code suitable for implementing the Newton-Raphson reciprocal calculation in a manner similar to the program code illustrated above in Table I, but incorporating the aforementioned special instructions:

TABLE IV

Newton-Raphson POWERPC Assembly Code

| fres | r0, B | # r0 = estimate 1/B |
| fnmsub_new | e0, r0, B, one | # e0 = 1−(B*r0) |
| fmadd_new | r1, r0, e0, r0 | # r1 = r0*e0 + r0 |
| fnmsub_new | e1, r1, B, one | # e1 = 1−(B*r1) |
| fmadd_new | r2, r1, e1, r1 | # r2 = r1*e1 + r1 |
| fnmsub_new | e2, r2, B, one | # e2 = 1−(B*r2) |
| fmadd_new | r3, r2, e2, r2 | # r3 = r2*e2 + r2 |

In the implementation of FIGS. 11-12, the E* values represent intermediate error values and the R* values represent intermediate result values. In addition, the special fnmsub instruction is used to detect when a floating point exponent of the E* operand is so much smaller than the exponent of the R* operand in the instruction that the floating point aligner would shift the E* mantissa far enough to the right that it would have no effect on the calculation. When this condition is detected, the early exit signal may be triggered. Thus, in the flowchart of FIG. 7, the determination of whether the desired accuracy has been achieved in block 276 may be implemented for example by determining whether the difference between the exponents of the correction term and that of the intermediate result reached a value greater than the width of the mantissa plus a rounding margin.

Table V below shows the operation of the program code in Table IV in processing the same operands as the prior Example B shown in Table III above:

TABLE V

Newton-Raphson Example C

B = 1.02 = 0x3FF051EB851EB852
| 1/B = fdiv(1,B) | = | 3FEF5F5F5F5F5F5F 0.980392 |
| r0 = fres(B) | = | 3F7B00003F828F5C 0.006592 (1/B) |
| e0 = fnmsub_new(r0,B,1) | = | BF147AE147AE1980 −0.0000781250 (1−(B*r0)) |
| r1 = fmadd_new(r0,t,r0) | = | 3FEF5F5F5C28F5C2 0.980392 (r0*e0 + r0) |
| e1 = fnmsub_new(r1,B,1) | = | 3E3A36E2EE6CD33A 0.000000 (1−(B*r1)) |
| r2 = fmadd_new(r1,e1,r1) | = | 3FEF5F5F5F5F5F5F 0.980392 (r1*e1 + r1) |
| e2 = fnmsub_new(r2,B,1) | = | 3C7C8FC2F6295C90 0.000000 (1−(B*r2)) |
| r3 = fmadd_new(r2,e2,r2) | = | 3FEF5F5F5F5F5F5F 0.980392 (r2*e2+ r2) |

As discussed above in connection with FIG. 11, the fmadd_new instruction will save the exponent of the last intermediate result value inside an internal register 302, and when the fnmsub_new instruction is executing, the exponent of the E* result is calculated much faster then the full result, and it can be compared with the previously stored R* exponent. If the difference between these two exponents is greater than the width of the mantissa, then the floating point aligner will shift the E* mantissa so far to the right that it will have no effect in the calculation, as if it were zero. Since the fmadd and fnmsub instructions used in the algorithm are special instructions only used for this algorithm, the dependency unit can then detect that the early exit condition has been met and not stall any of those special instructions.

In the example shown in Table V, assume a value of 53 for threshold 310 in logic 300. Execution of the fmadd_new instruction during the first iteration will result in an exponent for R1 of −1 during the first iteration, which will be stored in register 302 of logic 300. On the second iteration, execution of the fnmsub_new instruction will result in an exponent for E1 of −28, and the difference calculated by adder 306 will be 27, which is less than the threshold of 53, so no early exit is detected. The second iteration continues with execution of the fmadd_new instruction, which results in an exponent for R2 of −1, which will again be stored in register 302 of logic 300.

On the third iteration, execution of the fnmsub_new instruction will result in an exponent for E2 of −56, and the difference calculated by adder 306 will be 55, which is greater than the threshold of 53. As a result, an early exit condition is detected and early exit detect signal 314 is asserted. With the special instruction decode also asserted, read after write dependency detection is disabled, such that the last fmadd_new instruction that calculates R3 will be executed with dependency detection disabled for R3 and any dependencies on the result. FIG. 13 illustrates this execution from a timing perspective, where the early exit condition is detected in cycle 18, and the result is ready at cycle 20, resulting in a savings of two cycles for the algorithm.

As yet another alternate implementation, while an iterative refinement algorithm may be implemented using a static early exit condition, e.g., through the use of a fixed threshold that drives the detection of an early exit condition, it may be desirable in other embodiments to enable the early exit condition for an iterative refinement algorithm to be programmable, e.g., using a custom programmable threshold specified by an application program. For example, a special instruction, or an instruction with a special mode or opcode, may be used in addition with the other aforementioned special instructions to supply as an operand a threshold value for use in controlling the early exit condition. In one implementation, a special form of the fres instruction (designated herein as "fres_new") may be defined to receive as a second operand a threshold value that is stored in an internal register for comparison later in the algorithm.

Figures 14, 15:
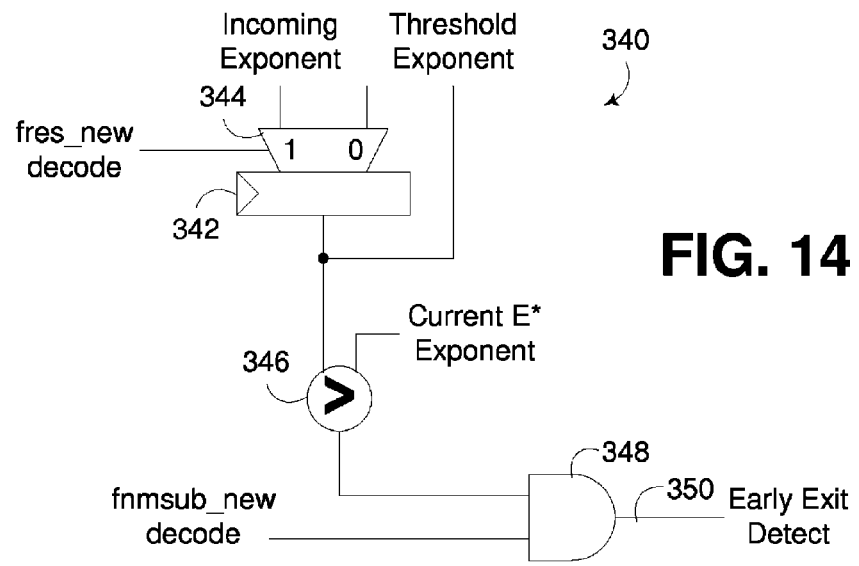
FIG. 14 is a block diagram of another implementation of the early exit detect logic to that illustrated in FIG. 7, and incorporating a programmable early exit condition.
FIG. 15 is a timing diagram illustrating the timing of instructions performed by an exemplary iterative refinement algorithm by a processing unit incorporating the early exit detect logic of FIG. 14.

FIG. 14, for example, illustrates at 340 another exemplary implementation of early exit detect logic suitable for use in processing unit 200 of FIG. 5. In this implementation, a "convergence" term (i.e., a term that approaches a small enough value such that it might as well be zero) is tracked via additional programmable early exit detection circuitry that compares the result exponent of this convergence term with the threshold value specified in the fres_new instruction. In particular, a register 342 is used to store a threshold exponent. A multiplexer 344 normally feeds the contents of register 342 back into the register to retain the prior threshold exponent, but latches a new threshold exponent into register 344 in response to a special instruction decode of the special fres_new instruction. The output of register 342 is fed to a comparator 346 to compare the current E* exponent with the threshold stored in register 342 such that, whenever the current E* exponent is less than the threshold, a logic "1" value is asserted to one input of an AND gate 348. Gate 348 performs a logical AND with a special instruction decode of a special fnmsub instruction (referred to herein as "fnmsub_new") such that an early exit detect signal 350 is asserted upon the fnmsub_new special instruction decode when the difference exceeds the threshold. Thus, in the flowchart of FIG. 7, the determination of whether the desired accuracy has been achieved in block 276 may be implemented in this implementation by determining whether the computed exponent is less than the stored threshold.

To further illustrate the operation of the implementation shown in FIG. 14, Table VI below illustrates program code suitable for implementing the Newton-Raphson reciprocal calculation in a manner similar to the program code illustrated above in Table IV, but incorporating an additional special instruction that specifies a threshold:

TABLE VI

Newton-Raphson POWERPC Assembly Code

| | | |
|---|---|---|
| fres_new | r0, B, T | # r0 = estimate 1/B |
| fnmsub_new | e0, r0, B, one | # e0 = 1−(B*r0) |
| fmadd_new | r1, r0, e0, r0 | # r1 = r0*e0 + r0 |
| fnmsub_new | e1, r1, B, one | # e1 = 1−(B*r1) |
| fmadd_new | r2, r1, e1, r1 | # r2 = r1*e1 + r1 |
| fnmsub_new | e2, r2, B, one | # e2 = 1−(B*r2) |
| fmadd_new | r3, r2, e2, r2 | # r3 = r2*e2 + r2 |

In this implementation, the special fres instruction is used to specify a threshold T in addition to the value of B for which the reciprocal is to be calculated. The special fnmsub instruction is used to detect when the floating point exponent of the E* operand is smaller than the specified threshold so that, when this condition is detected, the early exit signal may be triggered.

Table VII below shows the operation of the program code in Table VI in processing the same operands as the prior Examples B and C of Tables III and V:

TABLE VII

Newton-Raphson Example D

| | | |
|---|---|---|
| B = 1.02 = 0x3FF051EB851EB852 | | |
| 1/B= fdiv(1,B) | = | 3FEF5F5F5F5F5F5F 0.980392 |
| r0 = fres(B, −25) | = | 3F7B00003F828F5C 0.006592 (1/B) |
| e0 = fnmsub_new(r0,B,1) | = | BF147AE147AE1980 −0.0000781250 (1−(B*r0)) |
| r1 = fmadd_new(r0,t,r0) | = | 3FEF5F5F5C28F5C2 0.980392 (r0*e0 + r0) |
| e1 = fnmsub_new(r1,B,1) | = | 3E3A36E2EE6CD33A 0.000000 (1−(B*r1)) |
| r2 = fmadd_new(r1,e1,r1) | = | 3FEF5F5F5F5F5F5F 0.980392 (r1*e1 + r1) |
| e2 = fnmsub_new(r2,B,1) | = | 3C7C8FC2F6295C90 0.000000 (1−(B*r2)) |
| r3 = fmadd_new(r2,e2,r2) | = | 3FEF5F5F5F5F5F5F 0.980392 (r2*e2+ r2) |

As discussed above in connection with FIG. 14, the fres_new instruction will save the specified threshold of −25 to register 342, and when the fnmsub_new instruction is executing, the exponent of the E* result is compared with the threshold. If the exponent is less than the threshold, the custom early exit condition exists and will be detected. Since the fmadd and fnmsub instructions used in the algorithm are special instructions only used for this algorithm, the dependency unit (which may be similarly configured to dependency logic 320 of FIG. 12 can then detect that the early exit condition has been met and not stall any of those special instructions.

In the example shown in Table VII, it is assumed that an application is using double precision instructions, but only needs a result with single precision accuracy, so the application sets a custom threshold value in the fres_new instruction to −25. Execution of the fmadd_new instruction during the first iteration will result in an exponent for R1 of −1, and then on the second iteration, execution of the fnmsub_new instruction will result in an exponent for E1 of −28, which is less than the threshold, so an early exit condition will be detected and early exit detect signal 350 will be asserted. With the special instruction decode also asserted, read after write dependency detection is disabled, such that subsequent instructions in the algorithm will be executed with dependency detection disabled. FIG. 15 illustrates this execution from a timing perspective, where the early exit condition is detected in cycle 13, and the result is ready at cycle 16, resulting in a savings of six cycles for the algorithm.

It will be appreciated that other manners of programming a custom early exit condition may be used in the alternative. For example, other thresholds may be specified, and other intermediate values from the algorithm can be compared in various manners to a threshold. For example, a programmable early exit condition may be implemented in early exit detect logic 300 of FIG. 11 by programming threshold 310 in the manner described above in connection with FIG. 14. As another example, the early exit condition need not be based upon comparisons of the exponent portions of the intermediate results. In other embodiments, a programmable early exit condition may be implemented by comparing a full floating point value (exponent and mantissa and sign bit), or by triggering on a NaN or infinity, or enabled exceptions like divide by zero case, overflow, underflow, etc. Therefore, the invention is not limited to the use of a special instruction to specify as an operand a threshold value for an iterative refinement algorithm.

The herein-described ability to disable dependency stalls and write enables for subsequent instructions in an iterative refinement algorithm in an early exit thus allows for greater performance for such algorithms without great complexity or performance problems as compared to other solutions. Various modifications may be made to the illustrated embodiments without departing from the spirit and scope of the invention. The invention therefore lies in the claims hereinafter appended.

What is claimed is:

1. A circuit arrangement implemented in at least one integrated circuit device, comprising:
    a vector register file including a plurality of vector registers;
    a vector floating point execution unit including a multi-stage vector floating point execution pipeline;
    an issue unit coupled to the vector floating point execution unit and configured to issue instructions associated with an iterative refinement algorithm to the vector floating point execution unit, wherein the instructions associated with the iterative refinement algorithm include a floating point instruction having a read after write dependency relative to another instruction and configured to write back to the vector register file;
    dependency logic coupled to the issue unit and configured to selectively stall issuance of instructions having read after write dependencies by the issue unit;
    early exit detection logic configured to detect an early exit condition during execution of the iterative refinement algorithm by the vector floating point execution unit by comparing an intermediate error value for the iterative refinement algorithm against a threshold; and
    early exit logic configured to, in response to detection of the early exit condition by the early exit detection logic prior to completing the iterative refinement algorithm, disable write backs to the register file and stalls of subsequent instructions having read after write dependencies by the dependency logic until completion of execution of the iterative refinement algorithm.

2. A circuit arrangement implemented in at least one integrated circuit device, comprising:
    a register file;
    a multi-stage execution pipeline coupled to the register file and configured to execute an iterative refinement algorithm by executing a plurality of instructions, wherein the plurality of instructions includes at least one write back to the register file and at least one instruction with a dependency;
    dependency logic configured to selectively stall issuance of instructions having dependencies to the execution pipeline; and
    early exit logic configured to, in response to detection of an early exit condition during execution of the iterative refinement algorithm by the multi-stage execution pipeline prior to completing execution of the iterative refinement algorithm, disable write backs to the register file and stalls of subsequent instructions with dependencies by the dependency logic until completion of execution of the iterative refinement algorithm.

3. The circuit arrangement of claim 2, wherein the write back to the register file is performed by the instruction with the dependency.

4. The circuit arrangement of claim 2, wherein the write back to the register file is performed by a different instruction from that with the dependency.

5. The circuit arrangement of claim 2, wherein the dependencies comprise read after write dependencies.

6. The circuit arrangement of claim 5, wherein the dependency logic is configured to selectively stall issuance of instructions other than subsequent instructions with read after write dependencies while stalls of subsequent instructions with read after write dependencies are disabled.

7. The circuit arrangement of claim 2, wherein the iterative refinement algorithm is configured to converge to a result, and wherein the circuit arrangement is further configured to detect the early exit condition when a desired accuracy for the result has been achieved.

8. The circuit arrangement of claim 7, further comprising detect logic configured to detect the early exit condition by comparing an intermediate error value with a threshold.

9. The circuit arrangement of claim 2, further comprising detect logic configured to detect the early exit condition based upon an exponent portion of an intermediate value calculated by the iterative refinement algorithm.

10. The circuit arrangement of claim 9, wherein the iterative refinement algorithm includes a first instruction that calculates an intermediate error value and a second instruction that calculates an intermediate result value, and wherein the detect logic comprises:
    a register configured to load an exponent for the intermediate result value in response to decode of the second instruction;
    an adder configured to calculate a difference between the exponent for the intermediate result value and an exponent for the intermediate error value;
    a comparator configured to compare the difference with a threshold and assert a first signal in response to the difference exceeding the threshold; and
    an AND gate configured to generate an early exit detect signal based upon a logical AND of the first signal and a second signal asserted in response to decode of the first instruction.

11. The circuit arrangement of claim 2, wherein the multi-stage execution pipeline is configured to execute the iterative refinement algorithm by executing a plurality of iterations, and wherein the early exit logic is configured to disable write backs to the register file and stalls of the subsequent instructions with dependencies by the dependency logic after a portion of the plurality of iterations have been executed such that execution of a remaining portion of the plurality of iterations is completed with write backs to the register file and stalls of the instructions with dependencies disabled.

12. The circuit arrangement of claim 2, wherein the dependency logic is disposed in an issue unit, the circuit arrangement further comprising microcode logic configured to execute the iterative refinement algorithm by issuing instructions from a microcode routine to the issue unit, the microcode logic further configured to reset the early exit condition upon completion of the microcode routine.

13. The circuit arrangement of claim 2, wherein the iterative refinement algorithm comprises a Newton-Raphson algorithm.

14. The circuit arrangement of claim 2, wherein the execution pipeline comprises a vector floating point execution pipeline, and wherein the register file comprises a vector register file.

15. An integrated circuit device including the circuit arrangement of claim 2.

16. A program product comprising a non-transitory recordable computer readable medium with a logic definition program code resident thereon defining the circuit arrangement of claim 2.

17. A method of executing a refinement algorithm in a processing unit of the type including a multi-stage execution pipeline, a register file coupled to the multi-stage execution pipeline and dependency logic configured to selectively stall issuance of instructions having dependencies to the execution pipeline, the method comprising:
  executing an iterative refinement algorithm, including executing a plurality of instructions that includes at least one write back to the register file and at least one instruction with a dependency; and
  in response to detecting an early exit condition prior to completing execution of the iterative refinement algorithm, disabling write backs to the register file and stalls of subsequent instructions with dependencies by the dependency logic until completion of execution of the iterative refinement algorithm.

18. The method of claim 17, wherein the dependencies comprise read after write dependencies.

19. The method of claim 18, further comprising selectively stalling issuance of instructions other than subsequent instructions with read after write dependencies while stalls of subsequent instructions with read after write dependencies are disabled.

20. The method of claim 17, wherein the iterative refinement algorithm is configured to converge to a result, and wherein the method further comprises detecting the early exit condition when a desired accuracy for the result has been achieved.

21. The method of claim 20, further comprising detecting the early exit condition by comparing an intermediate error value with a threshold.

22. The method of claim 17, further comprising detect the early exit condition based upon an exponent portion of an intermediate value calculated by the iterative refinement algorithm.

23. The method of claim 22, wherein the iterative refinement algorithm includes a first instruction that calculates an intermediate error value and a second instruction that calculates an intermediate result value, and wherein detecting the early exit condition includes:
  loading an exponent for the intermediate result value into a register in response to decode of the second instruction;
  calculating a difference between the exponent for the intermediate result value and an exponent for the intermediate error value;
  comparing the difference with a threshold and asserting a first signal in response to the difference exceeding the threshold; and
  generating an early exit detect signal based upon a logical AND of the first signal and a second signal asserted in response to decode of the first instruction.

24. The method of claim 17, wherein the multi-stage execution pipeline is configured to execute the iterative refinement algorithm by executing a plurality of iterations, and wherein disabling write backs to the register file and stalls of subsequent instructions with dependencies by the dependency logic is performed after a portion of the plurality of iterations have been executed such that execution of a remaining portion of the plurality of iterations is completed with write backs to the register file and stalls of subsequent instructions with dependencies disabled.

25. A method of executing a refinement algorithm, comprising:
  executing in a multi-stage execution pipeline a portion of an iterative refinement algorithm, including executing a plurality of instructions having read after write dependencies and write backs to a register file;
  during execution of the portion of the iterative refinement algorithm, selectively stalling issuance of the instructions having read after write dependencies to the multi-stage execution pipeline until the read after write dependencies are resolved;
  detecting an early exit condition for the iterative refinement algorithm prior to completing execution of the iterative refinement algorithm;
  in response to detecting the early exit condition, disabling write backs to the register file and disabling selective stalling of instructions with read after write dependencies; and
  completing execution of the iterative refinement algorithm by executing at least one additional instruction having a read after write dependency and a write back to the register file while write backs to the register file are disabled and while selective stalling of instructions with read after write dependencies are disabled such that the additional instruction is not selectively stalled until its read after write dependency is resolved and such that the additional instruction does not write back to the register file.

* * * * *